E. O. SCHWEITZER.
ELECTRICITY METERING.
APPLICATION FILED APR. 9, 1917.
1,306,356. Patented June 10, 1919.
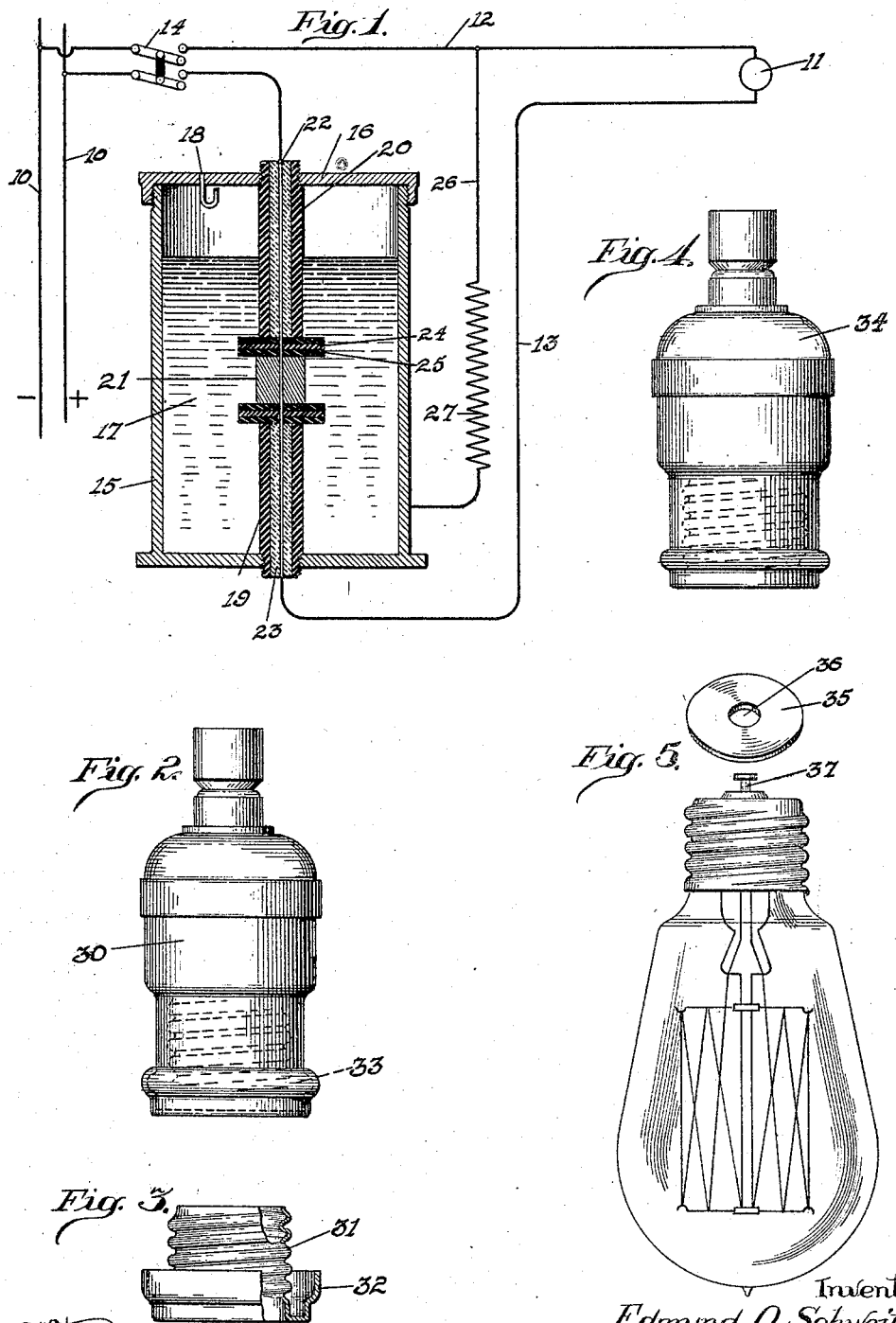
Witnesses
Milton Lenoir
Andrew Wintworth
Inventor
Edmund O. Schweitzer.
Williams Bradbury & Lee
Attorneys

UNITED STATES PATENT OFFICE.

EDMUND O. SCHWEITZER, OF CHICAGO, ILLINOIS.

ELECTRICITY-METERING.

1,306,356.  Specification of Letters Patent. Patented June 10, 1919.

Application filed April 9, 1917. Serial No. 160,727.

*To all whom it may concern:*

Be it known that I, EDMUND O. SCHWEITZER, a citizen of the United States, residing at Chicago, in the county of Cook and State of Illinois, have invented a certain new and useful Improvement in Electricity-Metering, of which the following is a full, clear, concise, and exact description, reference being had to the accompanying drawings, forming a part of this specification.

My invention relates to the art of electricity metering, and more specifically to an apparatus and method for opening an electric circuit by the electrolytic action of the current supplied to the circuit.

In my co-pending application, Serial #46,165, filed August 18, 1915, I have disclosed arrangements whereby a consumer's work circuit is electrolytically opened after a predetermined quantity of energy has been consumed, or after the consumer has availed himself of the energy supply for a definite time. While in my aforesaid co-pending application I have disclosed both of these embodiments of the invention therein disclosed and claimed, the more specific claims in said application have been directed to the method and arrangement of parts for opening the circuit after a predetermined quantity of energy has been consumed, whereas I propose to claim herein a method and arrangements of parts whereby the length of time the consumer has availed himself of the energy supply and not the energy consumed, is the dominating factor in determining when the work circuit shall be electrolytically opened and further consumption of energy prevented.

Briefly, in order to accomplish the objects of the invention hereinafter claimed, I provide an electrolytic cell comprising an electrolyte container, which desirably constitutes the cathode of the cell, an electrolyte in the container and an anode. The anode consists of a metal body desirably of copper and is of comparatively short length and of a definite mass. In the hereinafter described embodiment of my invention this anode is exposed to the electrolyte and is clamped between the adjacent ends of a pair of alined insulating sleeves which project into the electrolyte and serve as conduits for conductor leads whereby to connect the anode in series with the work circuit. The cathode or electrolyte container is connected with one side of the work circuit in such a way that a part of the current supply is diverted through the cell and in shunt of the load.

When the circuit arrangement herein described is employed the value of the circuit flowing through the shunt, including the cell, depends upon the line voltage and the resistance of the shunt and does not vary with the current flowing through the main circuit, including the load. The purpose of the shunt current is electrolytically to disintegrate the anode body and thereby open the work circuit after the consumer has availed himself of the energy supply for a certain definite time. It will be seen that if the line voltage is maintained substantially constant the anode will be disintegrated at a substantially constant rate whenever electrical energy is being consumed in the work circuit.

These and other features of my invention will be more fully described in connection with the accompanying drawings, wherein—

Figure 1 is a more or less diagrammatic view of a circuit provided with the improvements of my present invention;

Figs. 2 and 3 illustrate an ordinary socket or receptacle and means for rendering it incapable of receiving the usual plug with which such translating devices are ordinarily provided; and Figs. 4 and 5 illustrate a modified arrangement for accomplishing substantially the same end as the devices shown in Figs. 2 and 3.

Similar characters of reference refer to similar parts throughout the drawings.

Referring first to Fig. 1, I have illustrated at 10—10 a pair of feeders through which current at substantially constant voltage is supplied to the work circuit presently to be mentioned. At 11 I have illustrated a translating device, which for the purpose of illustration, may be considered a lamp load, said translating device being connected with the feeders 10—10 through conductors 12 and 13, and a switch, a conventional form of which is illustrated at 14.

The electrolytic metering device comprises an electrolyte container 15, which also constitutes the cathode of an electrolytic cell, the said electrolyte container having a cap 16 threaded thereon as shown. Contained within the container—cathode—is an electrolyte 17, desirably in the form of a neutral copper sulfate solution. The cap 16 is desirably provided with a capillary tube 18, to permit the escape of gases from the space above the electrolyte 17, without however, permitting any substantial leakage of the electrolyte. Threaded into the bottom of the electrolyte container, or otherwise suitably supported thereby, is an insulating sleeve 19, the free end of which terminates in the electrolyte at a point near the middle of the electrolyte container. Disposed in axial alinement with the insulating sleeve 19 is a similar insulating sleeve 20, the upper end of which is threaded into or otherwise suitably supported by the cap 16.

It will be noted that there is a substantial space between the adjacent ends of the insulating sleeves 19 and 20 and disposed in this space and securely clamped therein is a copper cylinder 21 which is exposed to the electrolyte 17 and is of considerable cross section and of comparatively short length. This copper cylinder constitutes the anode of the electrolytic cell and is of a definite mass inasmuch as it is the mass of this anode body which determines when the circuit including the load 11, shall be opened. Electrically connected with the copper anode body 21 and extending through the insulating sleeves 19 and 20, are conductor leads which serve to connect the anode body 21 in series with the translating device 11 and conductor 13 as a conducting part of one side of the work circuit fed from the feeders 10—10. The leads whereby the anode body 21 is connected in circuit as just explained are conveniently provided by sweating a copper wire 22 in the cylinder 21 as shown. The insulating sleeves 19 and 20 contain a material such as paraffin which is illustrated at 23—23 and surrounds the conductor leads which are disposed in the insulating tubes 19 and 20. Although I have specifically mentioned paraffin it is understood that any insulating material having a comparatively low melting point may serve the purpose for which this material is provided.

Disposed between the anode body 21 and the adjacent end of each of the insulating sleeves 19 and 20 are three disks arranged to prevent the electrolyte solution from entering either of said insulating sleeves. The central one of the three disks is in each instance indicated by the reference numeral 24 and is formed of fiber, hard rubber or some other suitable insulating material, the disks or washers 25—25 disposed on either side of each of the disks or washers 24 being formed of soft rubber, rubber fabric or some other yielding insulating material.

As has previously been explained, the anode body 21 constitutes in effect a conducting part of one side of the work circuit. A conductor 26 connects the copper electrolyte container or cathode 15 with the other side of said work circuit whereby a part of the current supplied to the work circuit is diverted from the anode 21 and through the electrolyte cathode and conductor 26 to the conductor 12—in shunt of the load. The value of the current permitted to flow through the shunt, including the cell, is determined by an impedance in the form of a non-inductive resistance 27, assuming the voltage to be substantially constant. I will state that in operating with direct current at 114 volts I have found that the impedance 27 should desirably have a resistance of between 21,000 and 42,000 ohms. The figures given are purely representative and I have merely mentioned 42,000 ohms as the maximum resistance because a shunt resistance substantially greater than 42,000 ohms would necessitate an extremely small anode and an extremely small clearance between the anode and cathode, requiring extremely accurate measurements which might be prohibitive.

In operation whenever electrical energy is being consumed in the work circuit a small current of constant value is caused to flow from the anode body 21 through the cell to the cathode and through the conductor 26 in shunt of the load. This slight flow of current serves gradually to dissolve or disintegrate the anode body 21 by electrolytic action. Inasmuch as the electrolytic dissolution or disintegration of the anode body is accomplished at a substantially constant rate when current is being consumed in the work circuit it will be seen that after the work circuit has been in use for a certain predetermined time the anode body will be entirely dissolved and the work circuit opened.

I have found that when the cross section of the anode cylinder 21 becomes very small the slender wire or thread remaining breaks. I have found that after this break occurs the current continues to flow between the broken ends by electrolytic conduction and from time to time the deposit will bridge the ends for a moment and then break away causing the lamp, in case the load is in the form of a lamp, to flicker distinctly. When this flicker occurs the consumer is notified that his supply of energy is about to be cut off. I have also found that after the consumer's work circuit has been opened by the dissolution of the copper anode 21 the heating of the separated ends tends to melt the paraffin surrounding the same whereupon the paraffin flows over the ends of the separated conductors and effectually stops further current flow.

It will be observed that when the arrangement just described is employed the current which serves electrolytically to decompose the anode does not vary directly with the current supplied to the translating device, the value of the current diverted through the cell being determined by the shunt resistance and the voltage and being thereby constant when the voltage is constant. It will thus be seen that when my present invention is employed the work circuit will be opened and further consumption of energy prevented after the consumer has availed himself of the energy supply for a certain definite time and not necessarily after any definite supply of electrical energy has been consumed.

It may be noted however, that the arrangement just described will serve to open the work circuit after a definite quantity of energy has been consumed if the load as well as the voltage is maintained substantially constant. Thus, when the circuit arrangement of Fig. 1 is employed it is sometimes desirable that the consumer's outlet be so equipped that no other translating device or devices other than those for whose use he has contracted can be connected in the work circuit. In Figs. 2 to 5 I have illustrated two arrangements whereby this end may be accomplished.

In Fig. 2 I have illustrated at 30 an ordinary socket or receptacle provided with means for adapting the socket for use only in connection with a special plug with which the translating device is provided. The means employed in this instance is an internally and externally threaded sleeve 31 provided with a suitable flange 32, arranged to be bent in over the bead 33 of the socket by means of a special tool. When the socket 30 is provided with a sleeve 31 as illustrated the socket is no longer capable of receiving an ordinary plug but will receive only the special plug with which the proper translating device is provided.

In Fig. 4 I have illustrated at 34 an ordinary socket or receptacle provided with a modified means for adapting it for use only in connection with a special plug with which the translating device is provided. The means employed in this instance is a disk 35 forced up into the socket 34, the said disk being provided with a central aperture 36. When this arrangement is used the plug of the translating device is provided with a suitable stem capable of being passed through the aperture 36 of the disk 35 when the plug is threaded into the receptacle. In Fig. 5 I have illustrated the disk 35 and a translating device in the form of a lamp equipped with a stem 37 arranged to be passed through the aperture 36 in the disk 35.

The arrangements illustrated in Figs. 2 to 5 inclusive are merely representative and it will be understood that various arrangements of this kind may be devised to accomplish the same end.

Having thus described my invention, what I claim as new and desire to secure by Letters Patent of the United States is:

1. In combination with an electric work circuit including a load, an electrolytic cell comprising an electrolyte, a cathode, a metal anode body immersed in the electrolyte and in contact therewith, insulated conductor leads for connecting the anode body in series with one side of said work circuit, and electricity conducting means for connecting the cathode with the other side of the work circuit for diverting a portion of the current supply through the cell in shunt of the load to disintegrate the anode body and open the circuit at that point.

2. In combination with an electric work circuit, including a load, to which current is supplied at substantially constant voltage, a metal anode body forming a conducting part of one side of said work circuit, an electrolyte wherein said metal body is immersed, a cathode in contact with the electrolyte and electricity conducting means for connecting said cathode with the other side of the work circuit for diverting a substantially constant current from said metal body through the electrolyte and in shunt of the load when current is being consumed in the work circuit.

3. In combination with an electric work circuit including a load, an electrolytic cell comprising an anode, a cathode and electrolyte, means connecting the anode in series with the load as a conducting part of the work circuit and means for diverting a part of the current supplied to said work circuit through the electrolyte and in shunt of the load electrolytically to disintegrate the anode.

4. In combination with an electric work circuit, including a load, an electrolytic cell comprising an anode, cathode and electrolyte, means connecting the anode in series with the load as a conducting part of one side of the work circuit, means for connecting the cathode with the other side of the work circuit, for diverting a part of the current supply through the cell in shunt of the load, and an impedance in said last mentioned means.

5. The method of controlling the supply of electrical energy to an electric work circuit which consists in electrolytically disintegrating one of the metal conductors of said circuit at a substantially constant rate independent of current variations whenever current is traversing the work circuit.

6. The method of limiting the supply of electrical energy to a work circuit which consists in electrolytically disintegrating one of the metallic conductors of said circuit at a point intermediate its ends at a substantially constant rate independent of current variations whenever energy is being consumed in the work circuit.

7. The apparatus for metering electricity supply comprising in combination with an electrolyte, a cathode, a pair of alined insulating sleeves projecting into the electrolyte, a metal anode body clamped between the ends of said sleeves, compressible washers disposed between said anode body and said sleeves and conductor leads extending through sleeves from said anode body.

8. The apparatus for metering electricity supply comprising in combination with an electrolyte, a cathode, a pair of alined insulating sleeves projecting into the electrolyte, a metal anode body clamped between the ends of said sleeves, a comparatively stiff and a compressible washer interposed between the anode body and the adjacent end of each of said sleeves and conductor leads extending through said sleeves to said anode body.

9. The apparatus for metering electricity supply comprising in combination with an electrolyte, a cathode, a pair of alined insulating sleeves projecting into the electrolyte, a metal anode body clamped between the ends of said sleeves, a comparatively stiff washer clamped between the anode body and the adjacent end of each of said sleeves, a compressible washer on each side of each of said stiff washers and conductor leads extending through said sleeves to the anode body.

10. The combination with an electric work circuit including a load, of an electrolytic cell comprising an electrolyte, a cathode, a metal anode body of predetermined mass immersed in the electrolyte and in contact therewith, insulated conductor leads for connecting the anode body in series with one side of said work circuit, and electricity conducting means for connecting the cathode with the other side of the work circuit for diverting a portion of the current supply through the cell in shunt of the load to disintegrate the anode body and open the circuit at that point.

11. The combination with an electric work circuit including a load, of an electrolytic cell comprising an anode of predetermined mass, a cathode, an electrolyte, means connecting the anode in series with the load as a conducting part of the work circuit, and means for diverting a part of the current supplied to the work circuit through the electrolyte and in shunt of the load to disintegrate the anode.

In witness whereof I hereunto subscribe my name this 6th day of April, A. D. 1917.

EDMUND O. SCHWEITZER.

Witnesses:
A. G. McCaleb,
L. Middleton.

Copies of this patent may be obtained for five cents each, by addressing the "Commissioner of Patents, Washington, D. C."